United States Patent [19]
Nakamura et al.

[11] Patent Number: 5,557,700
[45] Date of Patent: Sep. 17, 1996

[54] SEMICONDUCTOR OPTICAL DEVICE UTILIZING NONLINEAR OPTICAL EFFECT

[75] Inventors: Shigeru Nakamura; Kazuhito Tajima, both of Tokyo, Japan

[73] Assignee: NEC Corporation, Tokyo, Japan

[21] Appl. No.: 441,416

[22] Filed: May 15, 1995

[30] Foreign Application Priority Data

Jun. 14, 1994 [JP] Japan ..................... 6-131512

[51] Int. Cl.$^6$ .................................................. G02B 6/10
[52] U.S. Cl. ................. 385/122; 385/5; 372/45; 372/50
[58] Field of Search ............ 385/122, 5; 372/45, 372/50; 357/30

[56] References Cited

U.S. PATENT DOCUMENTS

| | | | |
|---|---|---|---|
| 4,961,198 | 10/1990 | Ishino et al. | 372/50 |
| 5,121,182 | 6/1992 | Kuroda et al. | 357/30 |
| 5,191,630 | 3/1993 | Tajima | 385/122 |
| 5,450,437 | 9/1995 | Shim et al. | 372/45 |

FOREIGN PATENT DOCUMENTS

| | | |
|---|---|---|
| 5-164455 | 7/1993 | Japan . |
| 6-186602 | 7/1994 | Japan . |

*Primary Examiner*—Rodney B. Bovernick
*Assistant Examiner*—Yisun Song
*Attorney, Agent, or Firm*—Sughrue, Mion, Zinn, Macpeak & Seas

[57] ABSTRACT

A semiconductor optical device having an optical waveguide which represents nonlinear refractive index change due to control light absorption. The waveguide has a bandgap wavelength that increases from its entrance to its exit. In the case of the waveguide divided into first to n-th regions, the bandgap wavelengths $\lambda_1, \lambda_2, \ldots, \lambda_{n-1}, \lambda_n$ of the regions satisfy the relationship $\lambda_1 < \lambda_2 < \ldots < \lambda_{n-1} < \lambda_n$. In the case of the waveguide not divided into regions, the bandgap wavelength $\lambda$ of the waveguide monotonously increases from the entrance to the exit. This device can operate by the control light having a lower energy than the conventional one.

17 Claims, 7 Drawing Sheets

SEMICONDUCTOR OPTICAL DEVICE UTILIZING NONLINEAR OPTICAL EFFECT

BACKGROUND OF THE INVENTION

1. Field of the Invention

The present invention relates to a semiconductor optical device and more particularly, to a semiconductor optical device having an optical waveguide which represents nonlinear refractive index change due to control light absorption.

2. Description of the Prior Art

To realize high-speed optical-fiber communication and optical information processing systems, higher speed operations are essential for signal light controlling devices used therefor.

With conventional semiconductor optical devices used for these applications, signal light has been controlled by electric signals applied to the corresponding optical devices, which is termed the "electrical control" of optical devices. Recently, a technique termed the "optical control" of optical devices" has been attracting a great deal of attention, in which signal light is controlled by control light instead of an electric signal.

An example of such the conventional semiconductor optical devices utilizing the above optical control is disclosed in the Japanese Non-Examined Patent Publication No. 6-186602 (July, 1994), the application No. of which is 4-341863.

This conventional optical device has an optical waveguide that represents any nonlinear change of refractive index due to absorption of control light introduced thereinto. The control light is introduced into the waveguide and is absorbed therein, exciting carriers, i.e., electrons and holes, in the waveguide. The carriers thus excited causes the "band-filling" effect, so that a nonlinear change of the refractive index of the waveguide is produced. The refractive index change of the waveguide phase-modulates the signal light propagating through the waveguide.

In the case of the nonlinear change of the refractive index due to the band-filling effect, such the refractive index change appears in an extremely short time (e.g., 1 ps or less) after the generation or excitation of the carriers. This means that the beginning time of the device operation is very short. The refractive index change, however, disappears in a comparatively long time that varies dependent upon the lifetimes (typically, 1 ns or less) of the excited carriers. This means that the ending time of the device operation is considerably long, which prevents a desired high-speed operation of the device.

With the above conventional device, since the electrostatic field is applied to the waveguide, the excited carriers in the waveguide are quickly swept or extracted from the waveguide, which means prompt recovery of the refractive index change or reduction of the long ending time. Thus, the operation speed of the optical device can be hastened.

The conventional semiconductor optical device disclosed in the Japanese Non-Examined Patent Publication No. 6-186602 has a structure shown in FIG. 1. As seen from FIG. 1, this device has a ridge R5 extending along the center line at the top of the device.

In FIG. 1, an n-$Al_xGa_{1-x}As$ (x=0.07) lower cladding layer 53 with a thickness of 2 μm is formed on a surface of a semi-insulating GaAs substrate 52. The substrate 52 is doped with Si at a concentration of $10^{18}$ atoms/cm³. The lower cladding layer 53 also is doped with Si at a concentration of $10^{18}$ atoms/cm³.

An undoped GaAs core layer 54 with a thickness of 0.5 μm is formed on the lower cladding layer 53. An undoped $Al_xGa_{1-x}As$ (x=0.07) upper cladding layer 55 with a thickness of 0.2 μm is formed on the core layer 54.

A p-$Al_xGa_{1-x}As$ (x=0.07) upper cladding layer 56 with a thickness of 0.6 μm is formed on the upper cladding layer 55. The layer 56 is doped with Be at a concentration of $10^{18}$ atoms/cm³.

A p-GaAs cap layer 57 with a thickness of 0.2 μm is formed on the upper cladding layer 56. The layer 57 is doped with Be at a concentration of $10^{18}$ atoms/cm³.

The upper cladding layer 56 and the cap layer 57 are selectively etched at each side of the ridge R5. The surface area of the upper cladding layer 55 also is etched at each side of the ridge R5.

A $SiO_2$ film 57 is formed to cover the exposed top faces of the upper cladding layer 55 and the exposed side faces of the upper cladding layers 55 and 56 and the cap layer 57.

An upper electrode 59 is formed on the $SiO_2$ film 57. The upper electrode 59 is in Ohmic contact with the exposed top face of the GaAs cap layer 57. A lower electrode 51 is formed on a back surface of the GaAs substrate 52. The lower electrode 51 also is in Ohmic contact with the substrate 52.

A backward bias voltage V (e.g., V=10 V) is applied across the upper and lower electrodes 59 and 51, so that an electrostatic field is applied to the undoped GaAs core layer 54.

An optical waveguide is formed in the core layer 54 right below the ridge R5 to extend along the ridge R5. Signal light is introduced into the waveguide together with control light along an arrow shown in FIG. 1. The control light thus introduced is absorbed in the waveguide by the core layer 54 to generate carriers, i.e., electrons and holes, therein, producing any nonlinear change of refractive index of the waveguide.

The carriers thus generated are promptly swept or extracted from the waveguide by the electrostatic field produced by the bias voltage V. In detail, the electrons are swept from the waveguide toward the lower cladding layer 53 and the holes toward the upper cladding layer 55. As a result, desired quick disappearance of the nonlinear refractive index change is realized.

The signal light introduced into the waveguide is phase-modulated by the above refractive index change in response to the introduction or absorption of the control light. Since the nonlinear change of refractive index is quickly generated due to the excited carriers and the sweep of the excited carriers performed by the electrostatic field quickly terminates the change, the signal light is controlled or phase-modulated at a higher speed than the case of no electrostatic field.

Typically, nonlinear refractive index change of a semiconductor material due to excited carriers increases dependent upon the density of the excited carriers. The increase rate of the refractive index change, however, decreases as the density of the carriers increases. In other words, the nonlinear refractive index change tends to saturate as the density of the carriers becomes large.

Therefore, if the excited carriers are distributed uniformly in the waveguide, a necessary density of the excited carriers for obtaining a desired refractive index change or phase shift is smaller than the case that the carriers are not distributed uniformly. In other words, the distribution uniformity of the excited carriers in the waveguide reduces the necessary energy of the control light for operating a semiconductor optical device.

With the conventional semiconductor optical device of FIG. 1, the bandgap wavelength of the waveguide is constant over the entire waveguide, which is equal to $\lambda_{g0}$, and the density of the excited carriers, which is $d_0$ at the entrance of the waveguide, decreases drastically from the entrance to the exit along the waveguide, as shown in FIG. 2. This means that the uniformity of the carrier density is very small.

Therefore, although the carrier density is relatively large in the vicinity of the entrance, an obtainable refractive index change does not become large in proportion with its large carrier density due to the saturation of the nonlinear optical effect. As a result, the control light needs to have a higher energy to realize a satisfactory, nonlinear change of refractive index over the full length of the waveguide.

SUMMARY OF THE INVENTION

Accordingly, an object of the present invention is to provide a semiconductor optical device that can operate by control light having a lower energy than the above conventional device.

A semiconductor optical device according to a first aspect of the present invention contains an optical waveguide through which signal light propagates from an entrance of the waveguide to an exit thereof.

The waveguide is divided into first to n-th regions arranged along the propagation direction of the signal light. The first region includes the entrance and the n-th region includes the exit.

The first to n-th regions have first to n-th bandgap wavelengths $\lambda_1$ to $\lambda_n$ that satisfy the relationship as $\lambda_1 < \lambda_2 \lambda \ldots < \lambda_{n-1} < \lambda_n$.

With the semiconductor optical device according to the first aspect of the invention, the first to n-th regions of the waveguide are arranged from the entrance of the waveguide to the exit thereof along the propagation direction of the signal light. Also, the first to n-th bandgap wavelengths $\lambda_1$ to $\lambda_n$ of the first to n-th regions satisfy the relationship of $\lambda_1 < \lambda_2 < \ldots < \lambda_{n-1} < \lambda_n$.

Therefore, energy band gaps $E_{g1}$ to $E_{gn}$ of the first to n-th regions satisfy the relationship of $E_{g1} > E_{g2} > \ldots > E_{g(n-1)} > E_{gn}$. This means that the density of carriers excited by the control light absorption changes or decreases within a narrower range than the case of the conventional one shown in FIG. 1 during the propagation of the signal light from the first region to the n-th region. In other words, the uniformity of the carrier density along the waveguide is larger than the case of the conventional one.

As a result, desired refractive index change can be obtained over the full length of the waveguide without saturation of the nonlinear optical effect. Accordingly, the optical device according to the first aspect of the invention can operate by the control light having a lower energy than the above conventional one.

A semiconductor optical device according to a second aspect of the present invention contains an optical waveguide similar to that of the first aspect. The waveguide of the second aspect is not divided into some regions arranged along the propagation direction of the signal light. The bandgap wavelength of the waveguide increase continuously and monotonously from the entrance of the waveguide to the exit of thereof.

With the semiconductor optical device according to the second aspect of the invention, since the bandgap wavelength of the waveguide increases from the entrance to the exit, an energyband gap of the waveguide decreases continuously and monotonously from the entrance to the exit. This means that the density of carriers excited by the control light absorption changes or decreases within a narrower range than the case of the conventional one shown in FIG. 1 during the propagation of the signal light from the entrance to the exit. In other words, the uniformity of the carrier density along the waveguide is larger than the case of the conventional one.

As a result, desired refractive index change can be obtained over the full length of the waveguide without saturation of the nonlinear optical effect, and therefore, the optical device according to the second aspect of the invention can also operate by the control light having a lower energy than the above conventional one.

A semiconductor optical device according to a third aspect of the present invention contains an optical waveguide formed on or over a surface of a semiconductor substrate, an insulator film formed to cover the optical waveguide, first to n-th upper electrodes formed on the insulator film, and a lower electrode formed on or over a back surface of the substrate.

The first to n-th upper-electrodes are arranged from the entrance of the waveguide to the exit thereof along the propagation direction of the signal light. Voltages $V_1$ to $V_n$ that satisfy the relationship of $V_1 < V_2 < \ldots < V_{n-1} < V_n$ are applied across said first to n-th upper electrodes and said lower electrode, respectively.

With the semiconductor optical device according to the third aspect of the invention, electric field intensities $e_1, \ldots, e_2, \ldots, e_{n-1}$ and $e_n$ generated by the voltages $V_1, V_2, \ldots,$ and $V_{n-1}$ and $V_n$ satisfy the following relationship as $e_1 < e_2 < \ldots < e_{n-1} < e_n$.

Typically, the absorption coefficient of a semiconductor material increases dependent upon the electric field intensity applied to the material due to the Franz-Keldysh effect. Since the regions of the waveguide corresponding to the first to n-th upper electrodes have the electric field intensities $e_1, e_2, \ldots, e_{n-1}$ and $e_n$ that satisfies the above relationship, the absorption coefficient $\alpha_1, \alpha_2, \alpha_{n-1}, \alpha_n$ of the regions satisfy the relationship of $\alpha_1 < \alpha_2 < \ldots, < \alpha_{n-1} < \alpha_n$.

As a result, similar to the device according to the first aspect, the density of carriers excited by the control light absorption changes or decreases within a narrower range than the case of the conventional one shown in FIG. 1 during the propagation of the signal light from the entrance to the exit. In other words, the uniformity of the carrier density along the waveguide is larger than the case of the conventional one.

Accordingly, the optical device according to the third aspect of the invention can operate by the control light having a lower energy than the above conventional one, because of no saturation of the nonlinear optical effect.

DESCRIPTION OF THE PREFERRED EMBODIMENTS

First Embodiment

Figure 3A:
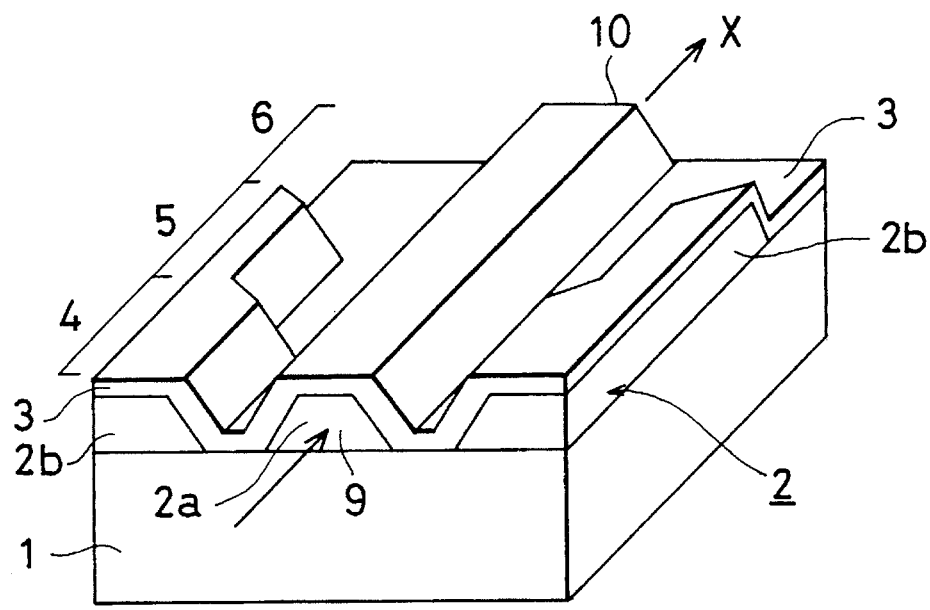
FIG. 3A is a schematic perspective view of a semiconductor optical device according to a first embodiment of the invention.

A semiconductor optical device according to a first embodiment of the invention is shown in FIG. 3A.

In FIG. 3A, this device has a semi-insulating InP substrate 1 and an InGaAs/InGaAsP multiquantum well (MQW) structure 2 selectively grown on the substrate 1 by a reduced-pressure metal organic vapor phase epitaxy (MOVPE). An InP layer 3 is grown to cover the MQW structure 2 and the exposed area of the substrate 1 by the same method. The MQW structure 2 is buried by the InP layer 3.

The reduced-pressure MOVPE is carried out, for example, under the following growth condition:

(a) substrate temperature: 625° C.

(b) growth chamber pressure: 76 Torr (c) source material: trimethylindium (TMI), triethylgallium (TEG), arsine ($AsH_3$), phosphine ($PH_3$)

Figure 3B:
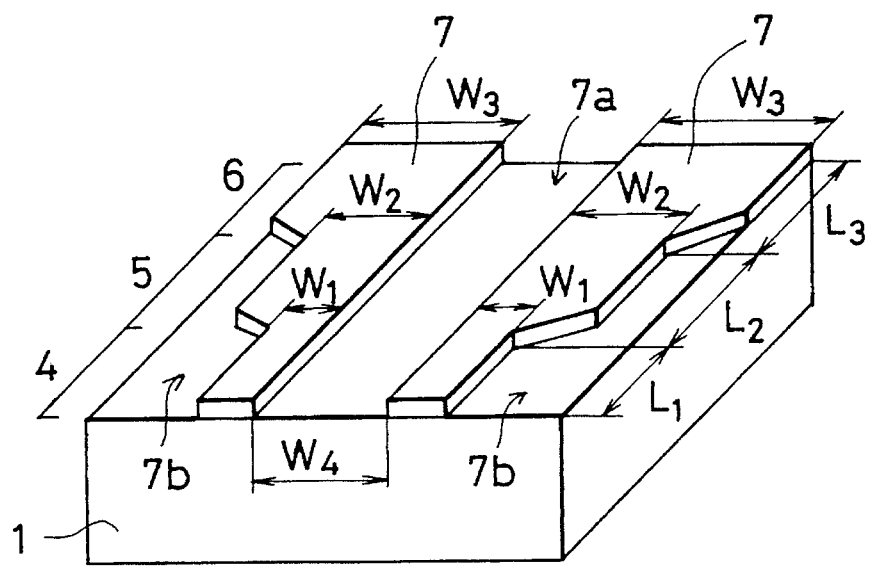
FIG. 3B is a schematic perspective view of a mask used for a fabrication process of the semiconductor optical device according to the first embodiment.

The MQW structure 2 is selectively grown on the substrate 1 using a mask 7 made of a patterned $SiO_2$ film as shown in FIG. 3B. The $SiO_2$ film is deposited by a chemical vapor deposition (CVD) or the like to be patterned through photolithography and etching processes. After the formation of the structure 2, the mask 7 is removed. The InP layer 3 is then formed thereon.

The mask 7 has a central window 7a of a strip-like shape and two side windows 7b arranged symmetrically at each side of the central window 7a, as shown in FIG. 3B. In other words, the mask 7 is made of two parts having symmetrical shapes.

The substrate 1 is divided into three regions 4, 5 and 6 that are arranged along the arrow X. The lengths or distances along the arrow X of the first, second and third regions 4, 5 and 6 are each 150 μm.

The mask 7 has different widths or distance perpendicular to the arrow X in the regions 4, 5 and 6. Each part of the mask 7 has widths $W_1$, $W_2$ and $W_3$ in the first, second and third regions 4, 5 and 6, respectively, as shown in FIG. 3B. Here, the widths $W_1$, $W_2$ and $W_3$ are 5 μm, 10 μm and 15 μm, respectively. Thus, each part of the mask 7 has a step-like edge at each side opposite to the central window 7a.

The width $W_4$ of the central window 7a is constant over he entire length of the window 7a. The width $W_4$ is here 2 μm.

Since the lengths $L_1$, $L_2$ and $L_3$ of each part of the mask 7 are equal to the lengths of the first, second and third regions 4, 5 and 6, respectively, they are each 150 μm.

The MQW structure 2 has a plan shape corresponding to the mask 7 because the structure 2 is selectively grown on the substrate 1 using the mask 7. In detail, as shown in FIG. 3A, the structure 2 is composed of a central part 2a having a plan shape corresponding to the central window 7a of the mask 7 and two side parts 2b having plan shapes corresponding to the side windows 7b thereof. The central part 2a is formed at a corresponding position to the central window 7a. The side parts 2b are formed at corresponding positions to the side windows 7b, respectively. The central part 2a acts as an optical waveguide having an entrance 9 and an exit 10.

Figure 3C:
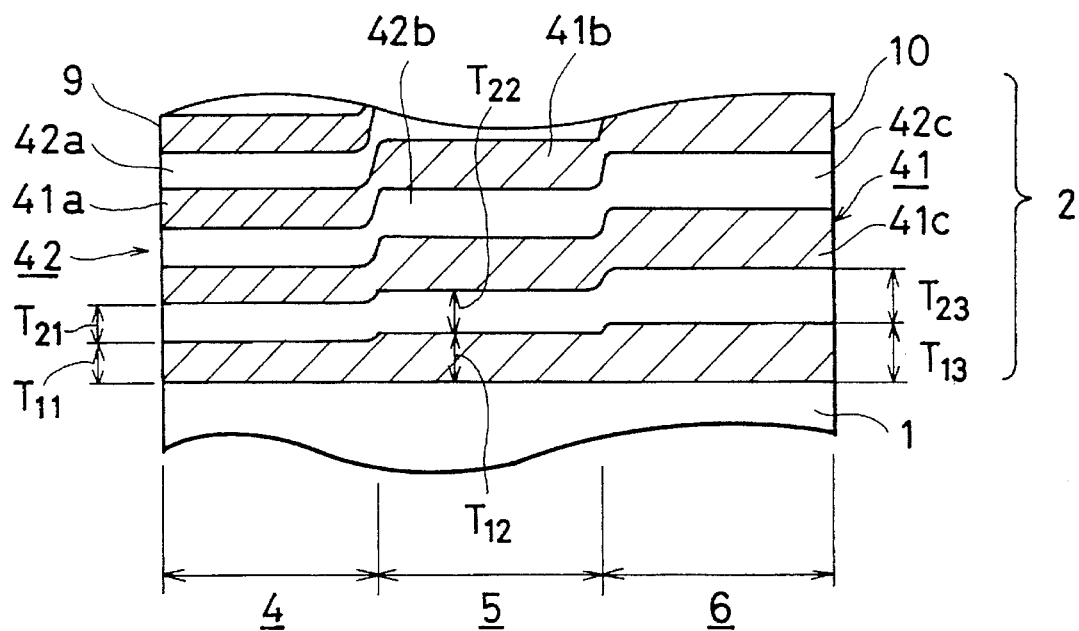
FIG. 3C is a partial, schematic cross-sectional view of the waveguide of the semiconductor optical device according to the first embodiment along its propagation direction.

The MQW structure 2 is made of twenty InGaAs well layers 42 and twenty InGaAsP barrier layers 41, as shown in FIG. 3C. The layers 42 and 41 are alternately stacked on the substrate 1. The lowest one of the barrier layers 41 is contacted with the substrate 1. The highest one of the barrier layers is contacted with the InP layer 3.

As shown in FIG. 3C, each of the InGaAsP barrier layers 41 has different thicknesses in the first, second and third regions 4, 5 and 6. Similarly, each of the InGaAs well layers 42 has different thicknesses in the first, second and third regions 4, 5 and 6.

Each of the barrier layers 41 contains a part 41a belonging to the first region 4, a part 41b belonging to the second region 5, and a part 41c belonging to the third region 6. The parts 41a, 41b and 41c have thicknesses $T_{11}$, $T_{12}$ and $T_{13}$, respectively. Here, $T_{11}$=3.2 nm, $T_{12}$=4.1 nm and $T_{13}$=5.3 nm.

Similarly, each of the well layers 42 contains a part 42a belonging to the first region 4, a part 42b belonging to the second region 5, and a part 42c belonging to the third region 6. The parts 42a, 42b and 42c have thicknesses $T_{21}$, $T_{22}$ and $T_{23}$, respectively. Here, $T_{21}$=3.2 nm, $T_{22}$=4.1 nm and $T_{23}$= 5.3 nm.

The above thickness differences of the barrier and well layers 41 and 42 among the first, second and third regions 4, 5 and 6 are caused by the width difference of the mask 7. In other words, the thicknesses $T_{11}$, $T_{12}$ and $T_{13}$ satisfy the relationship as $T_{11}<T_{12}<T_{13}$ due to the relationship of the widths of the mask 7 as $W_1<W_2<W_3$. Similarly, the thicknesses $T_{21}$, $T_{22}$ and $T_{23}$ satisfy the relationship as $T_{21}<T_{22}<T_{23}$ due to the same relationship of $W_1<W_2<W_3$.

Figure 4:
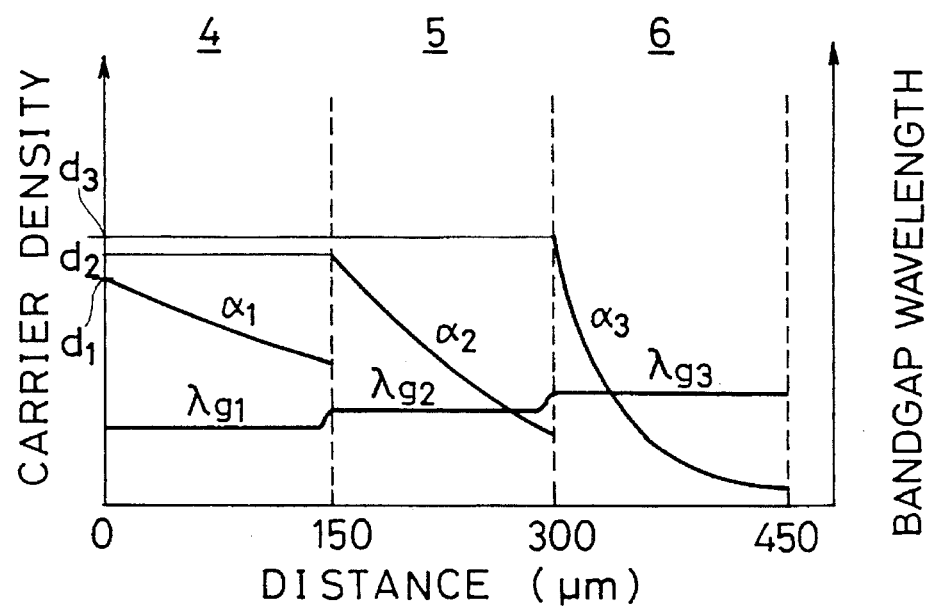
FIG. 4 is a graph showing the propagation distance dependency of the carrier density and the bandgap wavelength of the semiconductor optical device according to the first embodiment.

Each of the InGaAs well layers 42 has different bandgap wavelengths $\lambda_{g1}$, $\lambda_{g2}$ and $\lambda_{g3}$ in the first, second and third regions 4, 5 and 6, respectively. The wavelengths $\lambda_{g1}$, $\lambda_{g2}$ and $\lambda_{g3}$ satisfy the relationship as $\lambda_{g1}<\lambda_{g2}<\lambda_{g3}$, as shown in FIG. 4. Here, $\lambda_{g1}$–1.43 µm, $\lambda_{g2}$–1.46 µm, and $\lambda_{g3}$–1.50 µm. These values can be obtained by measuring the peak wavelengths of photoluminescence with regard to the respective regions 4, 5 and 6.

Such the difference of the bandgap wavelength is caused by the fact that the resultant quantum energy levels in the first, second and third regions 4, 5 and 6 become different due to the difference of the quantum well width.

Each of the inGaAs well layers 42 has different optical absorption coefficient $\alpha_1$, $\alpha_2$ and $\alpha_3$ for control light in the first, second and third regions 4, 5 and 6, respectively, where $\alpha_1<\alpha_2<\alpha_3$, as shown in FIG. 4.

Next, the operation of the semiconductor optical device according to the first embodiment is described below.

Signal light having a wavelength $\lambda_S$ is introduced into the waveguide 2a through the entrance 9 and emitted from the exit 10. Control light pulses having a wavelength $\lambda_C$ are introduced into the waveguide 2a through the entrance 9, and they are absorbed within the waveguide 2a. Each of the absorbed control light pulses generates carriers in the waveguide 2a, providing nonlinear change of refractive index of the waveguide 2a. The carriers thus generated disappear in a short time due to their recombination processes, and as a result, the nonlinear change of refractive index thus caused is extinguished.

Thus, the signal light is phase-modulated by absorption of the control light pulses during propagation within the waveguide 2a.

With the semiconductor optical device according to the first embodiment, the waveguide 2a has the first, second and third regions 4, 5 and 6 arranged from the entrance 9 to the exit 10 along the propagation direction of the signal light. Also, the first, second and third regions 4, 5 and 6 have the bandgap wavelengths $\lambda_{g1}$, $\lambda_{g2}$ and $\lambda_{g3}$, where $\lambda_{g1}<\lambda_{g2}<\lambda_{g3}$. In other words, the energyband gaps $E_{g1}$, $E_{g2}$ and $E_{g3}$ of the first, second and third regions 4, 5 and 6 satisfy the relationship of $E_{g1}>E_{g2}>E_{g3}$.

Therefore, the density of carriers excited by the control light absorption changes as shown in FIG. 4. In FIG. 4, the carrier density decreases from the initial value $d_1$ according to the absorption coefficient $\alpha_1$ in the first region 4. Similarly, the carrier densities decrease from the initial values $d_2$ and $d_3$ according to the absorption coefficients $\alpha_2$ and $\alpha_3$ in the second and third regions 5 and 6, respectively.

Because the initial values $d_1$, $d_2$ and $d_3$ has the relationship of $d_1<d_2<d_3$ due to $\lambda_{g1}<\lambda_{g2}<\lambda_{g3}$, and the absorption coefficients $\alpha_1$, $\alpha_2$ and $\alpha_3$ have the relationship of $\alpha_1<\alpha_2<\alpha_3$, the carrier density changes in the first, second and third regions 4, 5 and 6 along the curves shown in FIG. 4.

Figure 1:
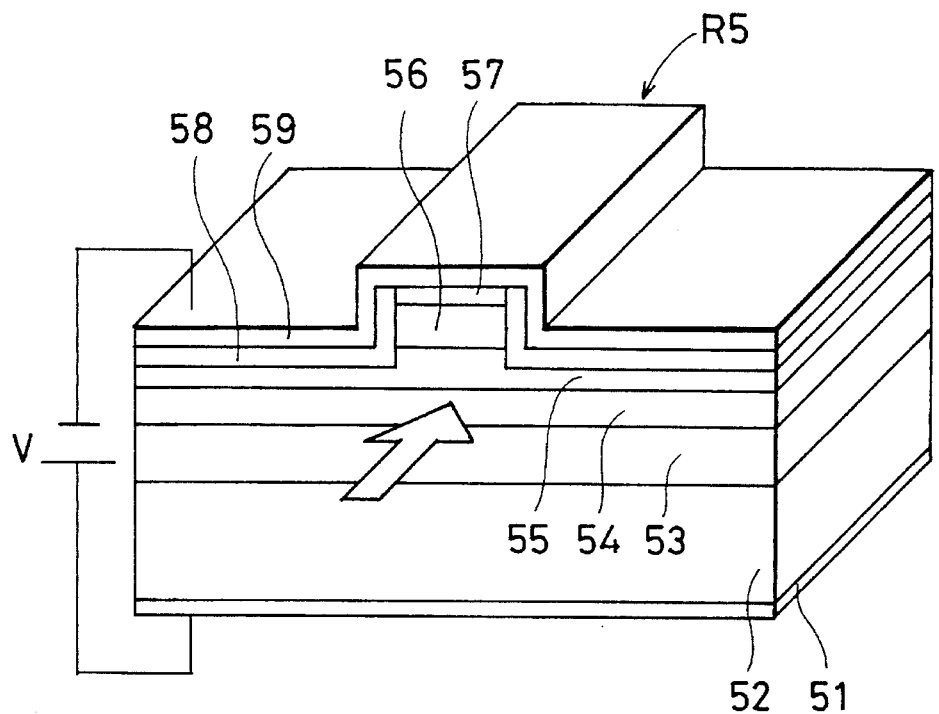
FIG. 1 is a schematic perspective view of a conventional semiconductor optical device.
Figure 2:
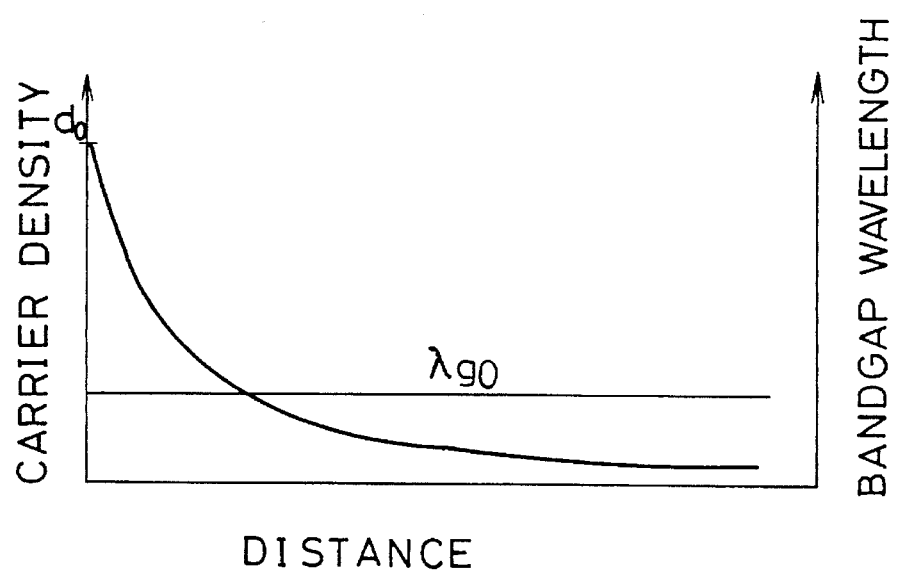
FIG. 2 is a graph showing the propagation distance dependency of the carrier density and the bandgap wavelength of the conventional semiconductor optical device shown in FIG. 1.

It is seen from FIG. 4 that the carrier density changes within a narrower range than the case of the conventional one shown in FIG. 2 during the propagation of the signal light throughout the waveguide 2a. In other words, the uniformity of the carrier density along the waveguide 2a is larger than the case of the conventional one.

As a result, desired refractive index change can be obtained over the full length of the waveguide 2a without saturation of the nonlinear optical effect. Accordingly, the semiconductor optical device according to the first embodiment can operate by the control light having a lower energy than the above conventional one.

Although the waveguide 2a is divided into three regions 4, 5 and 6. In this embodiment, the number of the regions is not limited to three. It is sufficient for the invention that the waveguide 2a is divided into at least two regions. However, it is preferable that the waveguide 2a is divided into four or more regions, because the absorption coefficient of each region can be adjusted more suitably.

Second Embodiment

Figure 5A:
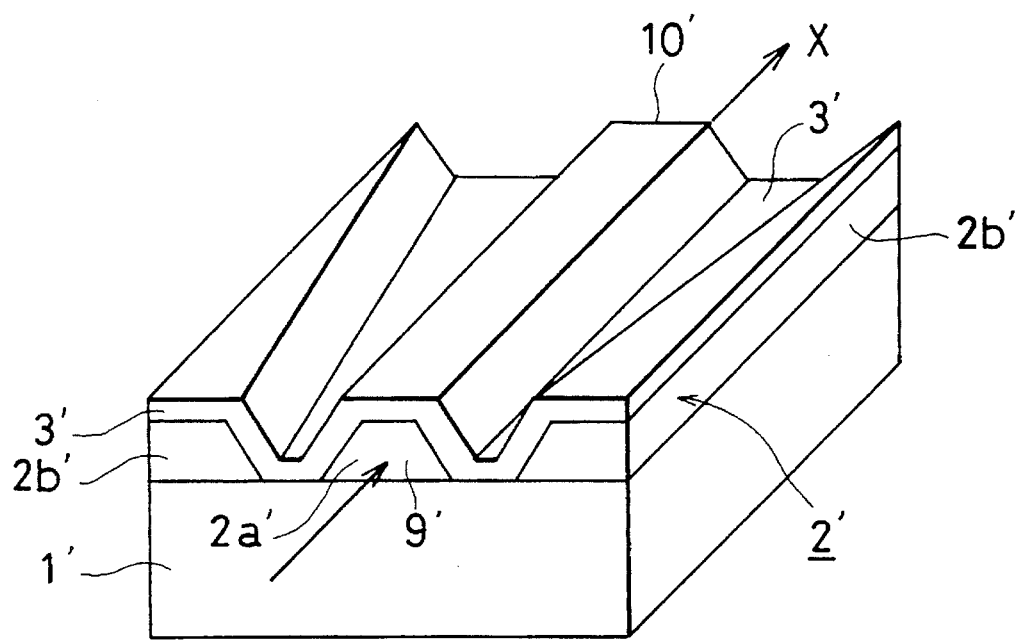
FIG. 5A is a schematic perspective view of a semiconductor optical device according to a second embodiment of the invention.

A semiconductor optical device according to a second embodiment of the invention is shown in FIG. 5A, which has a different plan shape of a MQW structure from the first embodiment.

As shown in FIG. 5A, this device has a semi-insulating InP substrate 1' and an InGaAs/InGaAsP MQW structure 2' selectively grown on the substrate 1' by a reduced-pressure MOVPE. An InP layer 3' is grown to cover the MQW structure 2' and the exposed area of the substrate 1' by the same method. The MQw structure 2' is buried by the InP layer 3'.

Figure 5B:
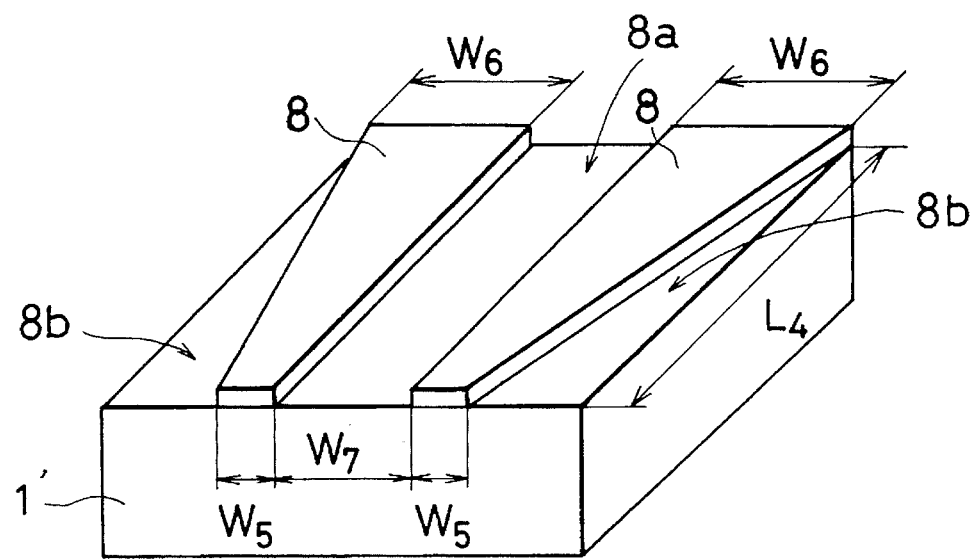
FIG. 5B is a schematic perspective view of a mask used for a fabrication process of the semiconductor optical device according to the second embodiment.

The MQW structure 2' is selectively grown on the substrate 1' using a mask 8 made of a patterned $SiO_2$ film as shown in FIG. 5B.

This device is fabricated by the same method as that of the first embodiment.

The mask 8 has a central window 8a of a strip-like shape and two side windows 8b arranged symmetrically at each side of the central window 8a, as shown in FIG. 5B. In other words, the mask 8 is made of two parts having symmetrical shapes.

Different from the first embodiment, the substrate 1' is not divided into some regions.

The mask 8 has a linearly increasing width or distance perpendicular to the arrow X. Each part of the mask 8 has widths $W_5$ and $W_6$ at each end of the mask 8, as shown in FIG. 5B. Here, the widths $W_5$ and $W_6$ are 5 µm and 15 µm, respectively. Thus, each part of the mask 8 has an oblique edge at each side opposite to the central window 8a.

The width $W_7$ of the central window 8a is constant over he entire length of the window 8a. The width $W_7$ is here 2 µm.

The total length $L_4$ of each part of the mask 8 is 450 µm, which is the same as that of the first embodiment.

The MQW structure 2' has a plan shape corresponding to the mask 8 because the structure 2' is selectively grown on the substrate 1' using the mask 8. In detail, as shown in FIG. 5A, the structure 2' is composed of a central part 2a' having a plan shape corresponding to the central window 8a of the mask 8 and two side parts 2b' having plan shapes corresponding to the side windows 8b thereof. The central part 2a' is formed at a corresponding position to the central window 8a. The side parts 2b' are formed at corresponding positions to the side windows 8b, respectively. The central part 2a' acts as an optical waveguide having an entrance 9' and an exit 10'.

Figure 5C:
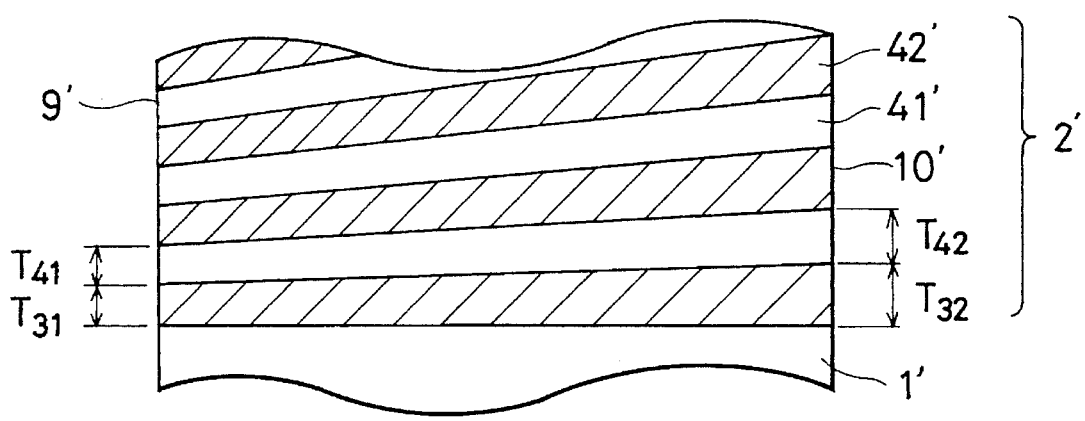
FIG. 5C is a partial, schematic cross-sectional view of the waveguide of the semiconductor optical device according to the second embodiment along its propagation direction.

The MQW structure 2' is made Of twenty InGaAs well layers 42' and twenty InGaAsP barrier layers 41', as shown in FIG. 5C. The layers 42' and 41' are alternately stacked on the substrate 1'. The lowest one of the barrier layers 41' is contacted with the substrate 1'. The highest one of the barrier layers 41' is contacted with the InP layer 3'.

As shown in FIG. 5C, each of the InGaAsP barrier layers 41' has a linearly increasing thickness from $T_{31}$ to $T_{32}$ over its entire length. Similarly, each of the InGaAs well layers 42' has a linearly increasing thickness from $T_{31}$ to $T_{32}$ over its entire length. Here, $T_{31}=T_{41}=3.2$ nm and $T_{32}=T_{42}=5.3$ nm.

The above thickness variations of the barrier and well layers 41' and 42' are caused by the width change of the mask 8. In other words, $T_{31}$ is smaller than $T_{32}$, i.e., $T_{31}<T_{32}$ and $T_{41}$ is smaller than $T_{42}$, i.e., $T_{41}<T_{42}$ due to the relationship $W_5<W_6$ of the widths of the mask 8.

Figure 6:
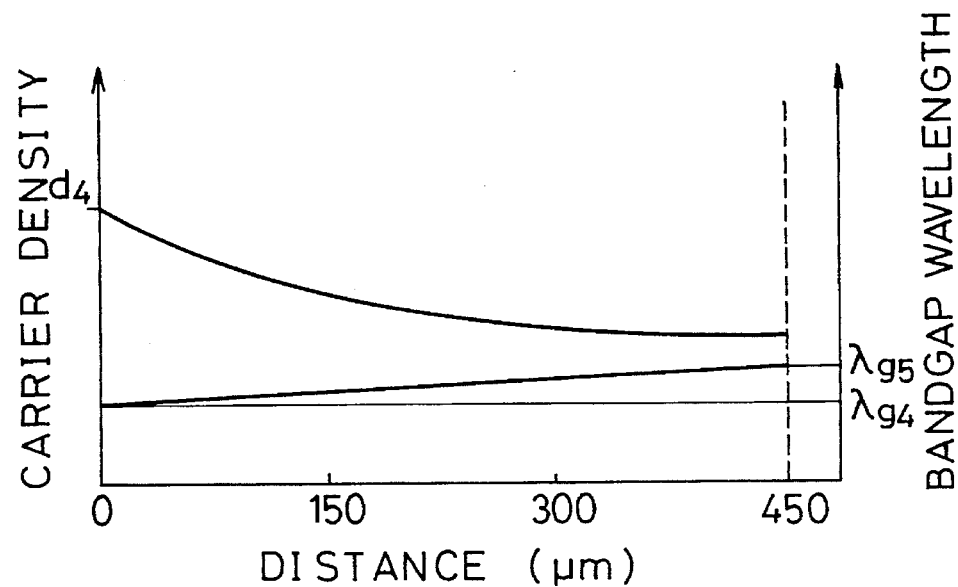
FIG. 6 is a graph showing the propagation distance dependency of the carrier density and the bandgap wavelength of the semiconductor optical device according to the second embodiment.

Each of the InGaAs well layers 42' has a linearly increasing bandgap wavelength from $\lambda_{g4}$ to $\lambda_{g5}$, as shown in FIG. 6. Here, $\lambda_{g4}=1.42$ μm and $\lambda_{g5}=1.50$ μm. These values can be obtained by measuring the peak wavelengths of photoluminescence in the vicinities of the entrance 9' and exit 10'.

Such the change of the bandgap wavelength is caused by the fact that the resultant quantum energy level changes along the waveguide due to the increase of the quantum well width.

Next, the operation of the semiconductor optical device according to the second embodiment is described below.

Signal light having a wavelength $\lambda_S$ (here, is $\lambda_S=1.55$ μm) is introduced into the waveguide 2a' through the entrance 9' and emitted from the exit 10'. Control light pulses having a wavelength $\lambda_C$ (here, $\lambda_C=1.50$ μm) are introduced into the waveguide 2a' through the entrance 9', and they are absorbed within the entire length of the waveguide 2a'. Each of the absorbed control light pulses generates carriers in the waveguide 2a', providing nonlinear change of refractive index of the waveguide 2a'. The carriers thus generated disappear in a short time due to their recombination processes, and as a result, the nonlinear change of refractive index thus caused is extinguished.

Thus, the signal light is phase-modulated by absorption of the control light pulses during propagation within the waveguide 2a'.

With the semiconductor optical device according to the second embodiment, the waveguide 2a' is not divided into some regions. However, since the waveguide 2a' has an increasing bandgap wavelength from $\lambda_{g4}$ to $\lambda_{g6}$, the energyband gap decreases from $E_{g4}$ to $E_{g5}$.

Therefore, the density of carriers excited by the control light absorption changes as shown in FIG. 6, in which the carrier density monotonously decreases from the initial value $d_4$ according to the absorption coefficient. It is seen from FIG. 6 that the carrier density changes within a narrower range than the case of the conventional one shown in FIG. 2 during the propagation of the signal light throughout the waveguide 2a'. In other words, the uniformity of the carrier density along the waveguide 2a' is larger than the case of the conventional one.

As a result, desired refractive index change can be obtained over the full length of the waveguide 2a' without saturation of the nonlinear optical effect. Accordingly, the semiconductor optical device according to the first embodiment can operate by the control light having a lower energy than the above conventional one.

Third Embodiment

Figure 7:
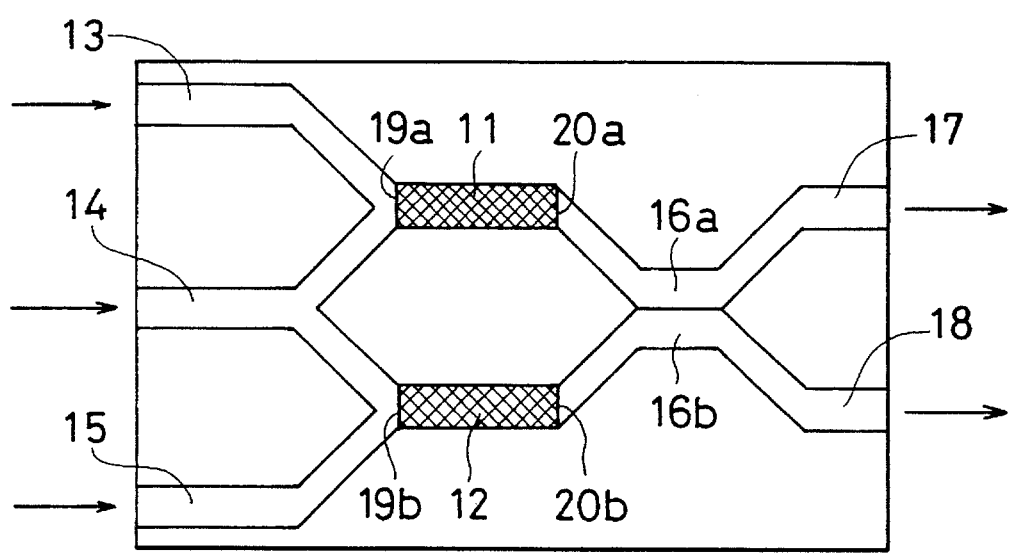
FIG. 7 is a schematic plan view of a semiconductor optical device according to a third embodiment of the invention.

A semiconductor optical device according to a third embodiment of the invention is shown in FIG. 7, which is equivalent to a concrete example of the optical device according to the first or second embodiment.

This device has an InGaAs/InGaAsP MQW structure selectively grown on a semi-insulating InP substrate. An InP layer is grown to cover the MQW structure and the exposed area of the substrate. The MQW structure is buried by the InP layer. This layered structure is the same as those of the first and second embodiments.

The device contains two optical waveguides 11 and 12, which are arranged apart in parallel and made of the optical devices according to the first or second embodiment. The waveguide 11 has an entrance 19a and an exit 20a. The waveguide 12 has an entrance 19b and an exit 20b.

The device further contains input ports 13 and 15 for control light, an input port 14 for signal light, interference regions 16a and 16b for the signal light, and output ports 17 and 18 for the signal light, each of which is made of an optical waveguide similar to that of the first or second embodiment.

The input port 13 is connected to the entrance 19a of the waveguide 11. The input port 15 is connected to the entrance 19b of the waveguide 12. The input port 14 is connected to the both entrances 19a and 19b of the waveguides 11 and 12.

The output port 17 is connected to the exit 20a of the waveguide 11 through the interference region 16a. The output port 18 is connected to the exit 20b of the waveguide 12 through the interference region 16b. The interference regions 16a end 16b are formed closely to each other.

The semiconductor optical device according to the third embodiment operates as follows:

The signal light having a wavelength of 1.55 μm is introduced into the input port 14. The control light having a wavelength of 1.50 μm is introduced as a pulse (pulse width: 1ps) into the input port 13 or 15. An initial pulse of the control light is introduced into the input port 13, and then, a next pulse of the control light is introduced into the input port 15 after a delay or interval of 10 ps.

In the initial state in which no control light is introduced, the signal light introduced into the input port 14 is emitted from the output port 17.

When the initial pulse of the control light is introduced into the input port 13, the pulse is absorbed in the optical waveguide 11 over its entire length, producing a nonlinear change of refractive index. Due to this change, the path of the signal light is switched to the output port 18.

The next pulse of the control light is introduced into the input port 15, the pulse is absorbed in the optical waveguide 12, producing another nonlinear change of refractive index. Due to this change in the waveguide 12, the optical effect of the change in the waveguide 11 is cancelled, so that the optical path of the signal light is switched again to the output port 17.

Thus, the optical path of the signal light is switched at a high-speed between the output ports 17 and 18 by the control light pulse.

With the optical device according to the third embodiment, since the optical waveguides 11 and 12 each has the same structure as the first or second embodiment, this device can be operated by the control light having a lower energy than the conventional one.

The principle of the above optical path switching of the signal light is disclosed in detail in the Japanese Patent Application No. 5-164455.

In the above first and second embodiments, the MQW structures 2 and 2' each is made of InGaAs and InGaAsP layers which can be grown on an ImP substrate. However, any other material such as GaAs and AlGaAs may be used, which can be grown on a GaAs substrate.

Also, although each of the layered structures is selectively grown by reduced-pressure MOVPE in the first and second embodiments, any other method such as molecular beam epitaxy (MBE) may be used.

Fourth Embodiment

Figure 8:
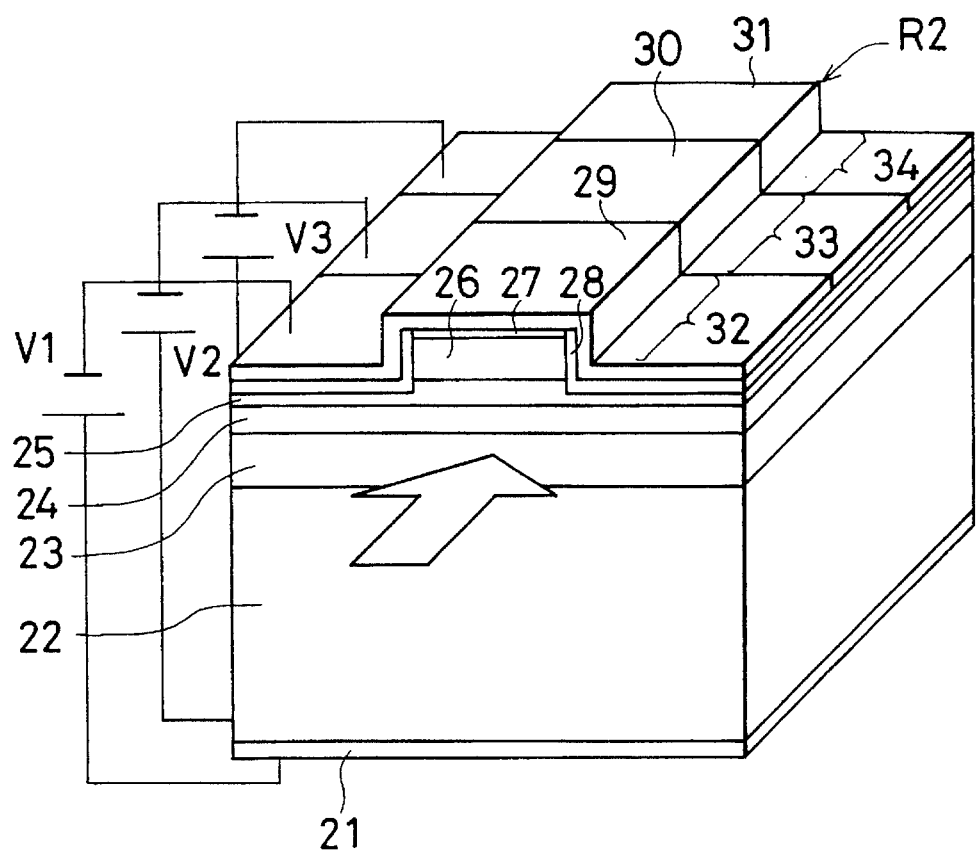
FIG. 8 is a schematic perspective view of a semiconductor optical device according to a fourth embodiment of the invention.
Figure 9:
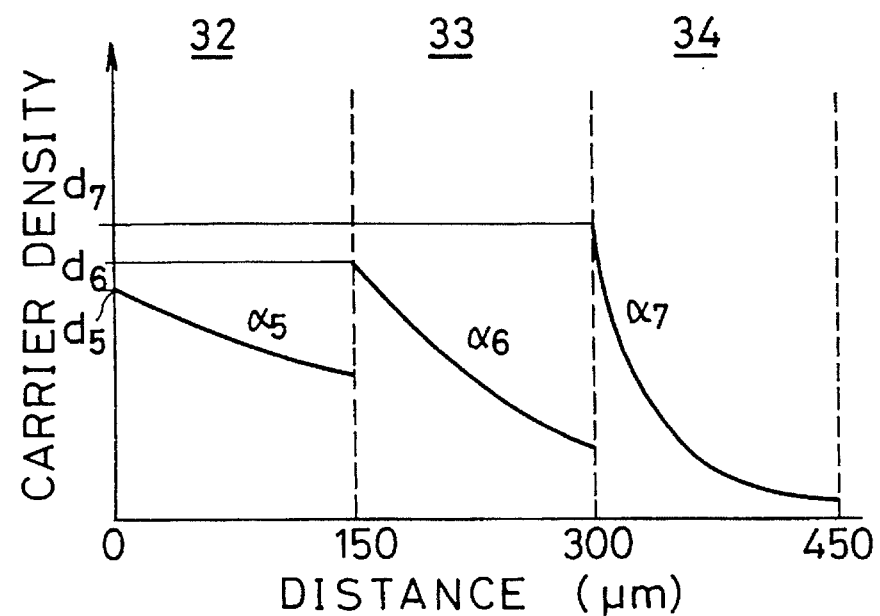
FIG. 9 is a graph showing the propagation distance dependency of the carrier density and the bandgap wavelength of the semiconductor optical device according to the fourth embodiment.

FIGS. 8 and 9 show a semiconductor optical device according to a fourth embodiment of the invention.

In FIG. 8, an n-$Al_xGa_{1-x}As$ (x=0.07) lower cladding layer 23 with a thickness of 2 µm is formed on a surface of a semi-insulating GaAs substrate 22. The substrate 22 is doped with Si at a concentration of $10^{18}$ atoms/cm$^3$. The lower cladding layer 23 also is doped with Si at a concentration of $10^{18}$ atoms/cm$^3$.

An undoped GaAs core layer 24 with a thickness of 0.5 µm is formed on the lower cladding layer 23. An undoped $AlGa_{1-x}As$ (x=0.07) upper cladding layer 25 with a thickness of 0.2 µm is formed on the core layer 24.

A p-$Al_xGa_{1-x}As$ (x=0.07) upper cladding layer 26 with a thickness of 0.6 µm is formed on the upper cladding layer 25. The layer 26 is doped with Be at a concentration of $10^{18}$ atoms/cm$^3$.

A p-GaAs cap layer 27 with a thickness of 0.2 µm is formed on the upper cladding layer 26. The layer 27 is doped with Be at a concentration of $10^{18}$ atoms/cm$^3$.

The upper cladding layer 26 and the cap layer 27 are selectively etched at each side of the ridge R2. The ridge R2 extends along the center line of the top of the device. The surface area of the upper cladding layer 25 also is etched at each side of the ridge R2.

A $SiO_2$ film 28 is formed to cover the exposed top faces of the upper cladding layer 25 and the exposed side faces of the upper cladding layers 25 and 26 and the cap layer 27.

Three upper electrodes 29, 30 and 31 are formed to be arranged along the ridge R2 on the $SiO_2$ film 27. The upper electrode 29, 30 and 31 are in Ohmic contact with the exposed top face of the GaAs cap layer 27. Proper gaps are formed between the electrodes 29 and 30 and between the electrodes 30 and 31, respectively for electrical insulation.

A lower electrode 21 is formed on a back surface of the GaAs substrate 22. The lower electrode 21 also is in Ohmic contact with the substrate 22.

The upper electrodes 29, 30 and 31 are made of a Cr layer and a Au layer stacked on the Cr layer. The lower electrode 21 is made of a Au-Ge-Ni layer and a Au-Ni layer stacked on the Au-Ge-Ni layer.

An optical waveguide is formed in the core layer 24 right below the ridge R2 to extend along the ridge R2.

Since the upper electrodes 29, 30 and 31 are arranged along the waveguide, different backward bias voltages can be applied across the upper electrodes 29, 30 and 31 and the lower electrode 21. Here, a backward bias voltage $V_1$ is applied across the upper electrode 29 and the lower electrodes 21, a backward bias voltage $V_2$ is applied across the upper electrode 30 and the lower electrode 21, and a backward bias voltage $V_3$ is applied across the upper electrode 31 and the lower electrode 21, where $V_1<V_2<V_3$. For example, $V_1=2$ V, $V_2=5$ V, and $V_3=10$ V.

Therefore, the waveguide is divided into three regions 32, 33 and 34 by the upper electrodes 29, 30 and 31, which are applied with the bias voltages $V_1$, $V_2$ and $V_3$, respectively.

If the intensities of electrostatic fields applied to the first, second and third regions 32, 33 and 34 are defined as $e_1$, $e_2$ and $e_3$, respectively, $e_1<e_2<e_3$ is established.

Typically, an optical absorption coefficient of a semiconductor material increases dependent upon the intensity of an applied electric field due to the Franz-Keldysh effect. If the optical absorption coefficients of the regions 32, 33 and 34 are defined as $\alpha_5$, $\alpha_6$ and $\alpha_7$, respectively, $\alpha_5<\alpha_6<\alpha_7$ is established, because the electric field intensities $e_1$, $e_2$ and $e_3$ of the regions 32, 33 and 34 satisfy the relationship of $e_1<e_2<e_3$.

Therefore, if the control light (e.g., $\lambda_C=0.90$ µm) is introduced into the waveguide together with the signal light (e.g., $\lambda_S=0.95$ µm), the density of excited carriers changes along the curves as shown in FIG. 9 due to the control light absorption. In FIG. 9, the carrier density decreases from the initial value $d_5$ according to the absorption coefficient $\alpha_5$ in the first region 32. Similarly, the carrier densities decrease from the initial values $d_6$ and $d_7$ according to the absorption coefficients $\alpha_6$ and $\alpha_7$ in the second and third regions 32, respectively.

It is seen from FIG. 9 that the carrier density changes within a narrower range than the case of the conventional one over the entire length of the waveguide. As a result, similar to the first to third embodiments, the semiconductor optical device according to the fourth embodiment also can operate by the control light having a lower energy than the conventional one.

In the fourth embodiment, three upper electrodes are provided, however, the number of the upper electrodes is not limited to three. It is preferable that four or more upper electrodes are provided, because the absorption coefficient of each waveguide region can be adjusted more suitably.

Also, though the waveguide is made of a bulk semiconductor material in the fourth embodiment, a MQW structure may be used for the waveguide as shown in the first and second embodiments.

In the fourth embodiment, any other material such as GaAs, InGaAsP, GaAs/AlGaAs and InGaAs/InGaAsP may be used, and any other fabrication method such as MBE may be used.

While the preferred forms of the present invention has been described, it is to be understood that modifications will be apparent to those skilled in the art without departing from the spirit of the invention. The scope of the invention, therefore, is to be determined solely by the following claims.

What is claimed is:

1. A nonlinear semiconductor optical device comprising:

an optical waveguide layer having an entrance and an exit and comprising nonlinear optical semiconductor material;

said waveguide layer being divided into first to n-th regions arranged along a propagation direction of said signal light, said first region including said entrance and said n-th region including said exit;

said first to n-th regions having first to n-th bandgap wavelengths $\lambda_1$ to $\lambda_n$ that satisfy a relationship of $$\lambda_1<\lambda_2<\ldots<\lambda_{n-1}<\lambda_n;$$

said waveguide layer generating a nonlinear change of refractive index in said nonlinear optical semiconductor material in response to a control light introduced into said entrance; and said waveguide layer propagating a signal light introduced into said entrance to said exit without a phase change of said signal light when said nonlinear change of refractive index induced by said control light is not present, and propagating said signal light with said phase change when said nonlinear change of refractive index induced by said control light is present, said phase change being in response to said change of refractive index.

2. The device as claimed in claim 1, wherein said waveguide layer has a multiple quantum well structure made of semiconductor well layers and semiconductor barrier layers, said first to n-th bandgap wavelengths $\lambda_1$ to $\lambda_n$ being produced by thickness difference of said well layers in said first to n-th regions.

3. The device as claimed in claim 2, wherein said first to n-th regions have first to n-th optical absorption coefficients $\alpha_1$ to $\alpha_n$ for said control light, respectively, and said absorption coefficients satisfy a relationship of $$\alpha_1 < \alpha_2 < \ldots < \alpha_{n-1} < \alpha_n.$$

4. The device as claimed in claim 2, wherein said thickness difference of said well layer is produced by width difference of a mask that is used for forming said quantum well structure.

5. A nonlinear semiconductor optical device comprising:
a semiconductor substrate;
an optical waveguide layer having an entrance and an exit, and comprising nonlinear optical semiconductor material, said waveguide layer being formed on or over said substrate;
said waveguide layer being divided into first to n-th regions arranged along a propagation direction of said signal light, said first region including said entrance and said n-th region including said exit;
said first to n-th regions having first to n-th bandgap wavelengths $\lambda_1$ to $\lambda_n$ that satisfy a relationship of $$\lambda_1 < \lambda_2 < \ldots < \lambda_{n-1} < \lambda_n;$$

a semiconductor layer formed to cover said waveguide layer;
said waveguide layer generating a nonlinear change of refractive index in said nonlinear optical semiconductor material in response to a control light introduced into said entrance: and
said waveguide layer propagating a signal light introduced into said entrance to said exit without a phase change of said signal light when said nonlinear change of refractive index induced by said control light is not present and propagating said signal light with said phase change when said nonlinear change of refractive index induced by said control light is present, said phase change being in response to said change of refractive index.

6. The device as claimed in claim 5, wherein said waveguide layer has a multiple quantum well structure made of semiconductor well layers and semiconductor barrier layers, said first to n-th bandgap wavelengths $\lambda_1$ to $\lambda_n$ being produced by thickness difference of said well layers in said first to n-th regions.

7. The device as claimed in claim 6, wherein said first to n-th regions have first to n-th optical absorption coefficients $\alpha_1$ to $\alpha_n$ for said control light, respectively, and said absorption coefficients satisfy a relationship of $$\alpha_1 < \alpha_2 < \ldots < \alpha_{n-1} < \alpha_n.$$

8. The device as claimed in claim 6, wherein said thickness difference of said well layer is produced by width difference of a mask that is used for forming said quantum well structure.

9. A nonlinear semiconductor optical device comprising:
an optical waveguide layer having an entrance and an exit, and comprising nonlinear optical semiconductor material;
a bandgap wavelength of said waveguide layer increasing continuously and monotonously from said entrance of said waveguide layer to said exit thereof;

said waveguide layer generating a nonlinear change of refractive index in said nonlinear optical semiconductor material in response to a control light introduced into said entrance; and
said waveguide layer propagating a signal light introduced into said entrance to said exit without a phase change of said signal light when said nonlinear change of refractive index induced by said control light is not present, and propagating said signal light with said phase change when said nonlinear change of refractive index induced by said control light is present, said phase change being in response to said change of refractive index.

10. The device as claimed in claim 9, wherein said waveguide layer has a multiple quantum well structure made of semiconductor well layers and semiconductor barrier layers, said bandgap wavelength being produced by thickness change of said well layers along said waveguide layer.

11. The device as claimed in claim 10, wherein said thickness change of said well layer is produced by width difference of a mask that is used for forming said quantum well structure.

12. A nonlinear semiconductor optical device comprising:
a semiconductor substrate;
an optical waveguide having an entrance and an exit, and comprising nonlinear optical semiconductor material, said waveguide layer being formed on or over said substrate;
a bandgap wavelength of said waveguide layer increasing continuously and monotonously from said entrance of said waveguide layer to said exit thereof;
a semiconductor layer formed to cover said waveguide layer;
said waveguide layer generating a nonlinear change of refractive index in said nonlinear optical semiconductor material in response to a control light introduced into said entrance; and
said waveguide layer propagating a signal light introduced into said entrance to said exit without a phase change of said signal light when said nonlinear change of refractive index induced by said control light is not present, and propagating said signal light with said phase change when said nonlinear change of refractive index induced by said control light is present, said phase change being in response to said change of refractive index.

13. The device as claimed in claim 12, wherein said waveguide layer has a multiple quantum well structure made of semiconductor well layers and semiconductor barrier layers, said bandgap wavelength being produced by thickness change of said well layers along said waveguide layer.

14. The device as claimed in claim 13, wherein said thickness change of said well layer is produced by width difference of a mask that is used for forming said quantum well structure.

15. A nonlinear semiconductor optical device comprising:
a semiconductor substrate;
a first optical waveguide through which signal light propagates from an entrance of said waveguide to an exit thereof, said waveguide being formed on or over said substrate;
said first waveguide comprising nonlinear optical semiconductor material;
said first waveguide being divided into first to n-th regions arranged along a propagation direction of said signal light, said first region including said entrance and said n-th region including said exit;

said first to n-th regions having first to n-th bandgap wavelengths $\lambda_1$ to $\lambda_n$ that satisfy a relationship of $$\lambda_1 < \lambda_2 < \ldots < \lambda_{n-1} < \lambda_n;$$

and a second optical waveguide connected to said entrance of said first waveguide, said second waveguide being formed on or over said substrate;

said second waveguide having a bandgap wavelength that does not allow control light to be absorbed;

wherein control light is introduced into said first waveguide through said second waveguide and propagates to be absorbed, generating nonlinear change of refractive index in said first waveguide.

16. A nonlinear semiconductor optical device comprising:

a semiconductor substrate:

a first optical waveguide through which signal light propagates from an entrance of said waveguide to an exit thereof, said waveguide being formed on or over said substrate;

said first waveguide comprising nonlinear optical semiconductor material;

a bandgap wavelength of said first waveguide increasing continuously from said entrance of said waveguide to said exit thereof;

a second optical waveguide connected to said entrance of said first waveguide, said second waveguide being formed on or over said substrate;

said second waveguide having a bandgap wavelength that does not allow control light to be absorbed;

wherein control light is introduced into said first waveguide through said second waveguide and propagates to be absorbed, generating nonlinear change of refractive index in said first waveguide.

17. A semiconductor optical device comprising:

a semiconductor substrate;

an optical waveguide formed on or over a surface of said substrate;

an insulator film formed to cover said waveguide;

first to n-th upper electrodes formed on said insulator film; and said first to n-th upper electrodes being arranged from an entrance of said waveguide to an exit thereof along a propagation direction of signal light; and a lower electrode formed on or over a back surface of said substrate;

wherein voltages $V_1$ to $V_n$ that satisfy a relationship of $V_1 < V_2 < \ldots < V_{n-1} < V_n$ are applied across said first to n-th upper electrodes and said lower electrode, respectively.

* * * * *

UNITED STATES PATENT AND TRADEMARK OFFICE
CERTIFICATE OF CORRECTION

PATENT NO. : 5,557,700
DATED      : Sept. 17, 1996
INVENTOR(S) : Shigeru Nakamura, et al It is certified that error appears in the above-indentified patent and that said Letters Patent is hereby corrected as shown below:

Column 9, line 38, delete "$\lambda_{g6}$" and insert --$\lambda_{g5}$--.

Column 10, line 23, delete "end" and insert --and--.

Signed and Sealed this

Thirty-first Day of December, 1996

Attest:

BRUCE LEHMAN

Attesting Officer     Commissioner of Patents and Trademarks